US010875804B2

(12) United States Patent
Demirbas et al.

(10) Patent No.: US 10,875,804 B2
(45) Date of Patent: Dec. 29, 2020

(54) GLASS MELTING SYSTEM AND METHOD FOR INCREASED HOMOGENEITY

(71) Applicant: Corning Incorporated, Corning, NY (US)

(72) Inventors: Memduh Volkan Demirbas, Ithaca, NY (US); William Gurney Dorfeld, Salida, CO (US); Susan Lee Schiefelbein, Ithaca, NY (US); Randy Dean Ziegenhagen, Savona, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/754,896

(22) PCT Filed: Aug. 24, 2016

(86) PCT No.: PCT/US2016/048263
§ 371 (c)(1),
(2) Date: Feb. 23, 2018

(87) PCT Pub. No.: WO2017/035174
PCT Pub. Date: Mar. 2, 2017

(65) Prior Publication Data

US 2018/0273416 A1    Sep. 27, 2018

Related U.S. Application Data

(60) Provisional application No. 62/210,080, filed on Aug. 26, 2015.

(51) Int. Cl.
*C03B 5/225*    (2006.01)
*C03C 3/091*    (2006.01)
(Continued)

(52) U.S. Cl.
CPC .............. *C03B 5/225* (2013.01); *C03B 5/04* (2013.01); *C03B 5/182* (2013.01); *C03B 5/193* (2013.01);
(Continued)

(58) Field of Classification Search
CPC ................................ C03B 5/193; C03B 5/225
See application file for complete search history.

(56) References Cited

U.S. PATENT DOCUMENTS

| | | | | |
|---|---|---|---|---|
| 4,325,724 A | * | 4/1982 | Froberg | C03B 5/173 501/35 |
| 4,351,664 A | * | 9/1982 | Bansal | C03B 5/23 65/128 |

(Continued)

FOREIGN PATENT DOCUMENTS

| | | |
|---|---|---|
| WO | 2012132471 A1 | 10/2012 |
| WO | 2012132472 A1 | 10/2012 |

(Continued)

OTHER PUBLICATIONS

Nebel; "Application of the Fining Shelf to Furnace Melting Technology"; 61st Conference on Glass Problems, Charles H. Drummond, 111; pp. 21-26; 2001.

(Continued)

*Primary Examiner* — Lisa L Herring (57) ABSTRACT

An apparatus and method for producing a glass article includes a melting vessel, a fining vessel located downstream from the melting vessel, and a bubbling vessel that is downstream from the melting vessel and upstream from the fining vessel. The fining vessel may include at least a first zone and a second zone downstream from the first zone, wherein the average temperature of the first zone is higher than the average temperature of the second zone.

8 Claims, 3 Drawing Sheets

(51) Int. Cl.
*C03B 5/193* (2006.01)
*C03B 5/04* (2006.01)
*C03B 5/182* (2006.01)
*C03B 5/43* (2006.01)
*C03B 7/07* (2006.01)
*C03C 3/085* (2006.01)
*C03C 3/097* (2006.01)

(52) U.S. Cl.
CPC .................. *C03B 5/43* (2013.01); *C03B 7/07* (2013.01); *C03C 3/085* (2013.01); *C03C 3/091* (2013.01); *C03C 3/097* (2013.01); *Y02P 40/57* (2015.11)

(56) References Cited

U.S. PATENT DOCUMENTS

| | | | |
|---|---|---|---|
| 7,032,412 B2 | 4/2006 | Dorfeld et al. | |
| 7,454,925 B2 | 11/2008 | DeAngelis et al. | |
| 7,854,144 B2 | 12/2010 | Delamielleure et al. | |
| 8,127,572 B2 | 3/2012 | Dorfeld et al. | |
| 2002/0121113 A1 | 9/2002 | Gohlke et al. | |
| 2004/0194511 A1* | 10/2004 | Cheng | C03B 37/0124 65/395 |
| 2006/0101859 A1* | 5/2006 | Takagi | C03B 5/187 65/32.5 |
| 2006/0105899 A1* | 5/2006 | Jacques | C03B 5/2356 501/56 |
| 2006/0122450 A1* | 6/2006 | Kim | C03B 3/02 588/6 |
| 2007/0022780 A1* | 2/2007 | House | C03B 5/193 65/29.21 |
| 2007/0151297 A1* | 7/2007 | DeAngelis | C03B 5/04 65/29.21 |
| 2009/0320525 A1 | 12/2009 | Johnson | |
| 2011/0203321 A1* | 8/2011 | De Angelis | C03B 5/163 65/45 |
| 2011/0204039 A1* | 8/2011 | De Angelis | C03B 5/027 219/438 |
| 2011/0302962 A1 | 12/2011 | Gattermann et al. | |
| 2012/0216574 A1 | 8/2012 | Dewet-Smith et al. | |
| 2013/0219968 A1* | 8/2013 | De Angelis | C03B 5/193 65/134.4 |
| 2014/0371116 A1* | 12/2014 | Hojaji | C03C 1/002 507/269 |

FOREIGN PATENT DOCUMENTS

| | | |
|---|---|---|
| WO | 2012133467 A1 | 10/2012 |
| WO | 2013054531 A1 | 4/2013 |
| WO | 2013054532 A1 | 4/2013 |

OTHER PUBLICATIONS

English Translation of CN201680049838.7 Office Action dated Apr. 26, 2020; 15 Pages; Chinese Patent Office.

* cited by examiner

GLASS MELTING SYSTEM AND METHOD FOR INCREASED HOMOGENEITY

CROSS-REFERENCE TO RELATED APPLICATIONS

This application claims the benefit of priority under 35 U.S.C. § 365 of International Patent Application Serial No. PCT/US16/48263 filed on Aug. 24, 2016, which in turn claims the benefit of priority to U.S. Provisional Application Ser. No. 62/210,080 filed on Aug. 26, 2015, the content of each are relied upon and incorporated herein by reference in their entirety.

BACKGROUND

Field

The present disclosure relates generally to glass melting systems and methods and more specifically to glass melting systems and methods for increased homogeneity.

Technical Background

Glass materials, such those used as flat panel glass for display applications, including LCD televisions and hand-held electronic devices have increasingly stringent requirements for blisters (i.e., defects in the glass that are the result of, e.g., bubbles in the glass melt). For example, the presence of a blister having a length of greater than 300 microns can make an entire glass sheet rejectable. In addition the number of rejectable blisters per pound of glass must be increasingly low.

Blisters can result from a number of sources in a glass manufacturing system. For example, in a glass premelt, bubbles can be formed from decomposition of batch materials and reactions at the electrodes. At platinum-glass interfaces, bubbles can be formed from hydrogen permeation and electrical cells. At free glass surfaces, such as in a stir chamber and inlet, bubbles can be formed from lapping of air. And on a glass forming device, bubbles can be formed from reactions between a refractory material of the forming device and the glass.

An important consideration in reducing blisters is to determine whether a bubble formation occurs before, after, or during fining (i.e., whether bubble formation occurs before, during, or after molten glass flows through a fining vessel). For bubble formation subsequent to flow through a fining vessel, prevention of bubble formation is emphasized as there may be little opportunity for bubbles to be removed from the glass melt in a subsequent processing step. For bubble formation prior to flow through a fining vessel, removal of bubbles is emphasized via growth and rise to the free glass surface. In order to maximize bubble rise velocities, a fining vessel typically operates at relatively high temperatures.

In addition, conditions in the fining vessel, such as increasingly high temperatures, may actually result in the generation of new bubbles. Such bubbles may result from one or more of any number of complex phenomena in a glass melt system, including but not limited to, bubble formation as a function of glass composition, temperature, and pressure (for example, the effect of temperature and pressure on the equilibrium reactions of components of a glass melt system) as well as various glass melt inhomogeneities, such as high-$SiO_2$ cords or knots.

SUMMARY

Disclosed herein is an apparatus for producing a glass article. The apparatus includes a melting vessel, a fining vessel located downstream from the melting vessel, and a bubbling vessel that is downstream from the melting vessel and upstream from the fining vessel.

Also disclosed herein is a method of producing a glass article. The method includes introducing molten glass into an apparatus for producing a glass article. The apparatus includes a melting vessel, a fining vessel located downstream from the melting vessel, and a bubbling vessel that is downstream from the melting vessel and upstream from the fining vessel.

In addition, disclosed herein are glass sheets made by the above method as well as electronic devices that include such glass sheets.

Additional features and advantages of these and other embodiments will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description present embodiments of the present disclosure, and are intended to provide an overview or framework for understanding the nature and character of the embodiments as claimed. The accompanying drawings are included to provide a further understanding of these and other embodiments, and are incorporated into and constitute a part of this specification. The drawings illustrate various embodiments of these and other embodiments, and together with the description serve to explain the principles and operations thereof.

DETAILED DESCRIPTION

Reference will now be made to embodiments of the present disclosure, examples of which are illustrated in the accompanying drawings. Whenever possible, the same reference numerals will be used throughout the drawings to refer to the same or like parts.

Figure 1:
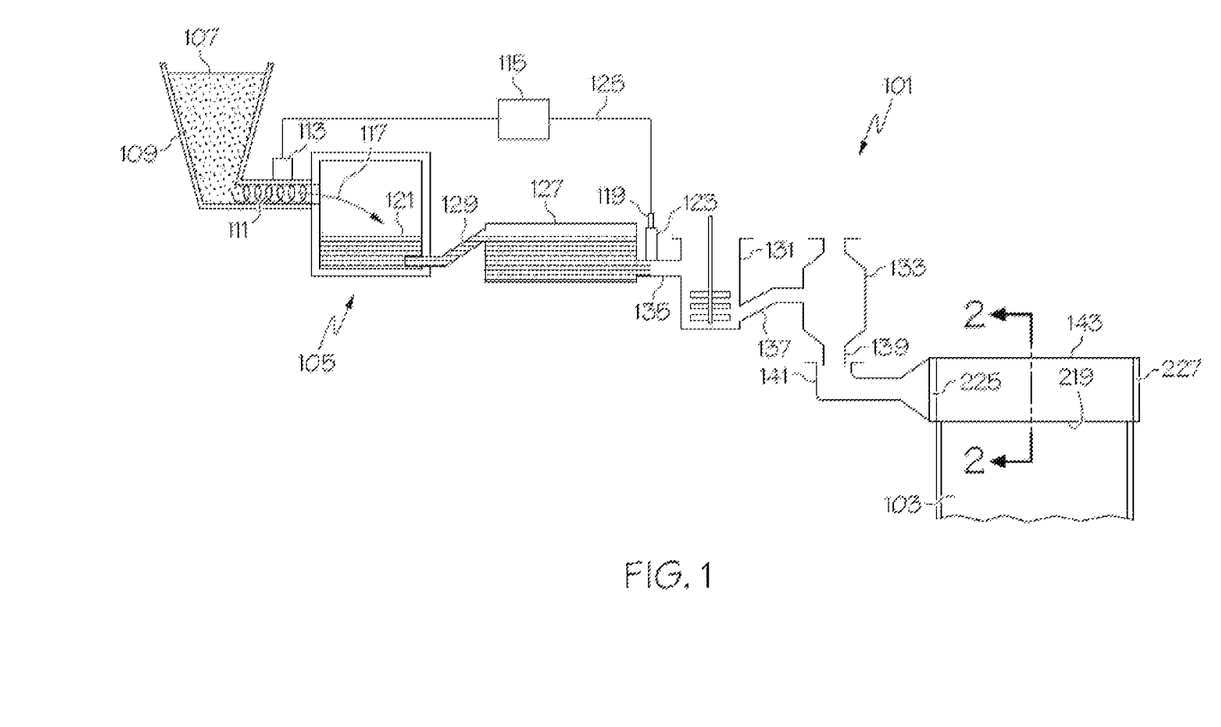
FIG. 1 is a schematic view of an apparatus for producing a glass article including a forming device in accordance with aspects of the disclosure.

FIG. 1 illustrates an exemplary schematic view of a glass forming apparatus 101 for fusion drawing a glass ribbon 103 for subsequent processing into glass sheets. The illustrated glass forming apparatus comprises a fusion draw apparatus although other fusion forming apparatus may be provided in further examples. The glass forming apparatus 101 can include a melting vessel (or melting furnace) 105 configured to receive batch material 107 from a storage bin 109. The batch material 107 can be introduced by a batch delivery device 111 powered by a motor 113. An optional controller 115 can be configured to activate the motor 113 to introduce a desired amount of batch material 107 into the melting vessel 105, as indicated by an arrow 117. A glass level probe 119 can be used to measure a glass melt (or molten glass) 121 level within a standpipe 123 and communicate the measured information to the controller 115 by way of a communication line 125.

The glass forming apparatus 101 can also include a fining vessel 127, such as a fining tube, located downstream from the melting vessel 105 and fluidly coupled to the melting vessel 105 by way of a first connecting tube 129. A mixing vessel 131, such as a stir chamber, can also be located downstream from the fining vessel 127 and a delivery vessel 133, such as a bowl, may be located downstream from the mixing vessel 131. As shown, a second connecting tube 135 can couple the fining vessel 127 to the mixing vessel 131 and a third connecting tube 137 can couple the mixing vessel 131 to the delivery vessel 133. As further illustrated, a downcomer 139 can be positioned to deliver glass melt 121 from the delivery vessel 133 to an inlet 141 of a forming device 143. As shown, the melting vessel 105, fining vessel 127, mixing vessel 131, delivery vessel 133, and forming device 143 are examples of glass melt stations that may be located in series along the glass forming apparatus 101.

The melting vessel 105 is typically made from a refractory material, such as refractory (e.g. ceramic) brick. The glass forming apparatus 101 may further include components that are typically made from platinum or platinum-containing metals such as platinum-rhodium, platinum-iridium and combinations thereof, but which may also comprise such refractory metals such as molybdenum, palladium, rhenium, tantalum, titanium, tungsten, ruthenium, osmium, zirconium, and alloys thereof and/or zirconium dioxide. The platinum-containing components can include one or more of the first connecting tube 129, the fining vessel 127 (e.g., finer tube), the second connecting tube 135, the standpipe 123, the mixing vessel 131 (e.g., a stir chamber), the third connecting tube 137, the delivery vessel 133 (e.g., a bowl), the downcomer 139 and the inlet 141. The forming device 143 is made from a refractory material, such as a ceramic, and is designed to form the glass ribbon 103.

Figure 2:
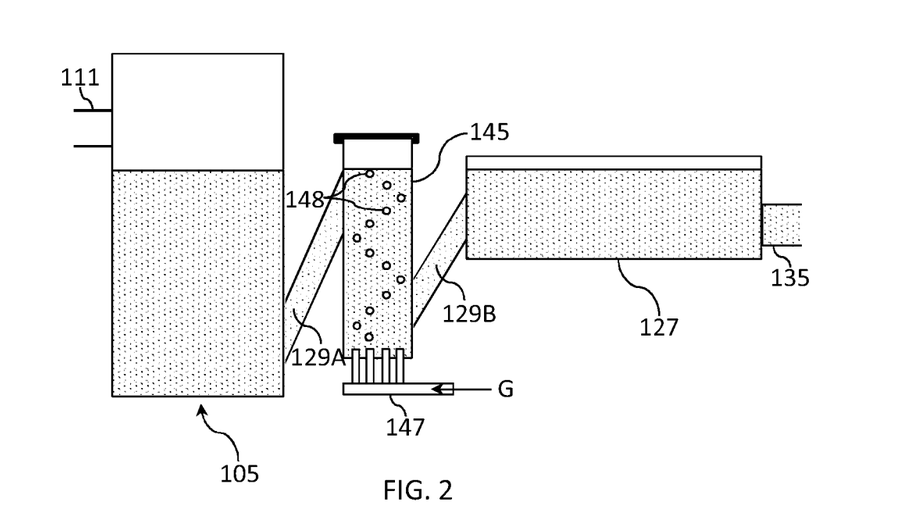
FIG. 2 is a schematic view of a portion of an apparatus for producing a glass article that includes a bubbling vessel according to embodiments disclosed herein.

FIG. 2 illustrates an exemplary schematic view of a portion of a glass forming apparatus wherein the apparatus includes a bubbling vessel 145. In the embodiment illustrated in FIG. 2, a fining vessel 127 is located downstream from a melting vessel 105, and the bubbling vessel 145 is downstream from the melting vessel 105 and upstream from the fining vessel 127. The bubbling vessel 145 is fluidly connected to the melting vessel 105 via a bubbling vessel inlet tube 129A and is fluidly connected to the fining vessel 127 via a bubbling vessel outlet tube 129B. Gas (G) is introduced to the bottom of bubbling vessel 145 via gas feed 147, which ultimately leads to the formation of gas bubbles 148, which rise in gas bubbling vessel 145.

Figure 3:
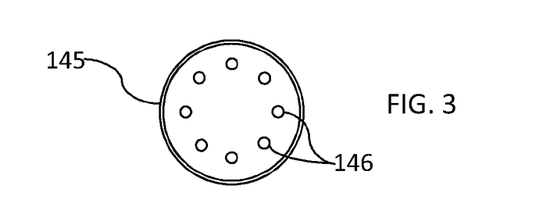
FIG. 3 is a top cutaway view of the bottom of a bubbling vessel according to embodiments disclosed herein.

FIG. 3 illustrates an exemplary top cutaway view of a bubbling vessel 145 having a plurality of gas feed orifices 146, which allow passage of gas introduced to the bottom of bubbling vessel 145 via gas feed 147. In the embodiment illustrated in FIG. 3, gas feed orifices 146 are arranged in a generally circular pattern.

While, in the embodiment of FIGS. 2 and 3, bubbling vessel 145 is shown as having a vertical tubular shape (e.g., a cylinder with a circular or oval cross-section), it is to be understood that embodiments disclosed herein include those in which bubbling vessel 145 may have other shapes, such as a rectangular shape (e.g., with a square or rectangular cross-section). In addition, while the embodiment of FIG. 3 shows gas feed orifices 146 arranged in a generally circular pattern, it is to be understood that embodiments disclosed herein include those in which gas feed orifices may be arranged in other patterns such as elliptical patterns, square patterns, rectangular patterns, linear patters, or patterns having other shapes or configurations.

In certain exemplary embodiments, bubbling vessel 145, gas feed 147, and gas feed orifices 146 may be operated such that the release of gas into gas feed orifices 146 is timed such that the bubbles are sequentially formed and rise in the bubbling vessel in a predetermined pattern, such as an upward spiral pattern. Formation of such patterns may enable an enhanced mixing effect within bubbling vessel 145, wherein the drag effect of the bubbles in the gas melt provides a stirring action, which can minimize or eliminate various glass melt inhomogeneities, such as the types of inhomogeneities that can result in cord or knots in the ultimate glass product.

The average size of the gas bubbles 148 within the glass melt in the bubbling vessel 145, while not limited, may, for example, be at least 2 millimeters in diameter in order to enable sufficient bubble rise under expected column height and temperature (glass melt viscosity) conditions, as can be configured by persons of ordinary skill in the art. For example, the average size of the gas bubbles 148 may range from about 2 millimeter diameter to about 50 millimeter diameter, such as from about 5 millimeter diameter to about 20 millimeter diameter, and further such as from about 10 millimeter diameter to about 15 millimeter diameter.

The rate of introduction of gas bubbles 148 into the bubbling vessel 145 can depend on a number of factors including, but not limited to, flow rate of the glass melt through the bubbling vessel, glass composition, temperature of the bubbling vessel, pressure of the bubbling vessel, degree of desired mixing effect, and the gas species being introduced, among others.

In addition to providing a mixing effect, introduction of bubbles into the glass melt in bubbling vessel 145 may introduce gaseous species into the gas melt that may alter gas chemistry, specifically by adding desirable gasses that facilitate fining and by minimizing or eliminating gases that may be detrimental to fining. For example, the introduction of certain gas species in the glass melt in the bubbling vessel 145 may lead to the reduction of gases such as $SO_2$, which has high equilibrium pressure in many glass melts, while at the same time, supporting an oxidized fining redox agent, such as tin, so that there is abundant oxidized species that can release $O_2$ when heated in the finer. Along these lines, the introduction of certain gas species in the glass melt in the bubbling vessel 145 may lead to a reduction of gas bubbles that are generated in the fining vessel 127, especially when at least a portion of the fining vessel 127 is operated at higher temperatures.

While not limited to any particular gaseous species, gas (G) introduced to the bottom of bubbling vessel 145 may, for example, be selected from at least one of the group consisting of nitrogen, oxygen, air, noble gases (e.g., He, Ne, Ar, Kr, etc.), and mixtures of the same. For example, in certain exemplary embodiments, gas (G) introduced into the bottom of the bubbling vessel 145 may comprise at least 50 mol % nitrogen, such as at least 60 mol % nitrogen, including at least 80 mol % nitrogen, including from 50 to 100 mol % nitrogen, such as from 60 to 90 mol % nitrogen. Gas (G) introduced into the bottom of the bubbling vessel 145 may also comprise mixtures of at least nitrogen and oxygen, such as a mixture comprising at least 50 mol % nitrogen and up to 50 mol % oxygen, such as mixtures comprising from 50 to 90 mol % nitrogen and from 10 to 50 mol % oxygen, including from 60 to 80 mol % nitrogen and from 20 to 40 mol % oxygen.

The bubbling vessel 145, bubbling vessel inlet tube 129A, and/or bubbling vessel outlet tube 129B may be constructed using a high temperature metal, and in particular a high temperature metal that is resistant to oxidation. Suitable metals can be selected, for example, from the platinum group metals, i.e. platinum iridium, rhodium, palladium, osmium and ruthenium. Alloys of the platinum group metals may also be used. For example, bubbling vessel 145, bubbling vessel inlet tube 129A, and/or bubbling vessel outlet tube 129B may be constructed from platinum or an alloy of platinum, such as a platinum-rhodium alloy.

The average temperature of the bubbling vessel 145 may generally be expected to be at least as high as the average temperature of the melting vessel 105 while, at the same time, being lower than the average temperature in the fining vessel 127.

In certain exemplary embodiments, the average temperature of the bubbling vessel 145 may be from 0° C. to 150° C. higher than the average temperature of the melting vessel 105, such as from 50° C. to 100° C. higher than the average temperature of the melting vessel 105. In such embodiments, the average temperature in the bubbling vessel 145 may be less than the average temperature in the fining vessel 127, such as at least 50° C., and further such as at least 75° C., and yet further such as at least 100° C. less than the average temperature in the fining vessel 127, including from 50° C. to 200° C., such as from 75° C. to 150° C. less than the average temperature in the fining vessel 127.

For example, if the average temperature of the melting vessel 105 is at least 1500° C., the average temperature of the bubbling vessel 145 may also be at least 1500° C., such as from 1500° C. to 1650° C., including from 1550° C. to 1600° C. If the average temperature of the bubbling vessel 145 is at least 1500° C., the average temperature of the fining vessel 127 may be at least 1550° C., such as from 1550° C. to 1700° C., including from 1575° C. to 1675° C.

In certain exemplary embodiments, the average temperature of the bubbling vessel outlet tube 129B may be higher than the average temperature of the bubbling vessel 145 and bubbling vessel inlet tube 129A, such as at least 25° C. higher than the average temperature of the bubbling vessel 145 or bubbling vessel inlet tube 129A, including from 25° C. to 150° C. higher than the average temperature of the bubbling vessel 145. For example, if the average temperature of the bubbling vessel 145 is at least 1500° C., the average temperature of the bubbling vessel outlet tube 129B may be at least 1525° C., such as from 1525° C. to 1700° C.

In certain exemplary embodiments, the average temperature of the bubbling vessel 145 may be higher than the average temperature of the bubbling vessel inlet tube 129A, such as at least 25° C. higher than the average temperature of the bubbling vessel inlet tube 129A, including from 25° C. to 100° C. higher than the bubbling vessel inlet tube 129A. For example, if the average temperature of the bubbling vessel inlet tube 129A is at least 1500° C., the average temperature of the bubbling vessel 145 may be at least 1525° C., such as from 1525° C. to 1625° C.

The temperature of the molten glass in the bubbling vessel 145, bubbling vessel inlet tube 129A, bubbling vessel outlet tube 129B, and fining vessel 127 may be controlled such that the molten glass is at or near the fining temperature as it enters the fining vessel 127. While indirect heating of one or more of these elements by external heating coils may be employed, heating may be more efficiently accomplished by a direct heating method, as described in more detail below.

Figure 4:
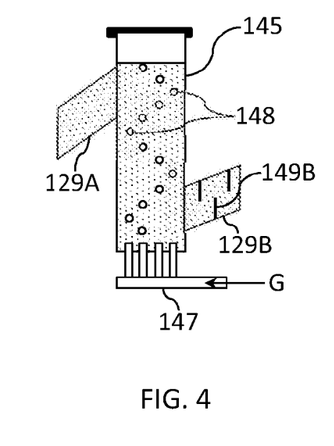
FIG. 4 is a schematic view of a glass bubbling vessel and connecting tubes, wherein an outlet connecting tube to the gas bubbler includes a static mixer.

FIG. 4 illustrates an exemplary schematic view of a glass bubbling vessel 145, bubbling vessel inlet tube 129A, and bubbling vessel outlet tube 129B, wherein outlet tube 129B includes a mixer and, in particular, a static mixer 149B. Static mixer 149B can provide a torturous path for glass melt exiting the bubbling vessel 145, thereby enabling improved mixing and increased homogeneity of the glass melt and further reducing or eliminating inhomogeneities that can result in cord or knots in the ultimate glass product.

Figure 5:
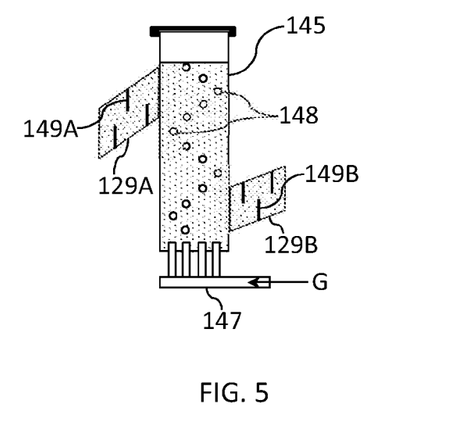
FIG. 5 is a schematic view of a glass bubbling vessel and connecting tubes, wherein inlet and outlet connecting tubes to the gas bubbler include static mixers.

FIG. 5 illustrates an exemplary schematic view of a glass bubbling vessel 145, bubbling vessel inlet tube 129A, and bubbling vessel outlet tube 129B, wherein inlet tube 129A includes a mixer and, in particular, a static mixer 149A, and wherein outlet tube 129B includes a mixer and, in particular, a static mixer 149B. Static mixers 149A and 149B can provide a torturous path for glass melt entering and exiting the bubbling vessel 145, thereby enabling improved mixing and increased homogeneity of the glass melt and further reducing or eliminating inhomogeneities that can result in cord or knots in the ultimate glass product.

While FIGS. 4 and 5 illustrate static mixers, it is to be understood that embodiments disclosed herein also include other types of mixers, such as active mixers, for example, mixers having a rotating blade and shaft wherein the blade may rotate, for example, through operation of motor, such as an electric motor. Embodiments disclosed herein also include static mixers having geometries other than shown in FIGS. 4 and 5, such as plates that extend the entire diameter of the inlet and/or outlet tubes and have various patterned openings to allow molten glass flow there through. Embodiments disclosed herein also include those in which the inlet tube to the bubbling vessel includes at least one mixer and the outlet tube to be bubbling vessel may not contain at least one mixer (not shown).

As the molten glass is conveyed through the delivery apparatus, it is conditioned by passing it through a fining vessel where a de-gasification process takes place. During the melting process a variety of gases are evolved. If left within the molten glass, these gases can produce bubbles in the finished glass article, such as the glass sheet from the fusion process. To eliminate bubbles from the glass, the temperature of the molten glass is raised in the fining vessel to a temperature greater than the melting temperature. Multivalent compounds included in the batch and present in the molten glass release oxygen during the increase in temperature and aid in sweeping the gases formed during the melting process from the molten glass. The gases are released into a vented volume of the fining vessel above a free surface of the molten glass. The temperature in the fining vessel can in some cases, for example in the production of glass sheets for the display industry, exceed 1650° C. and even exceed 1700° C. and approach the melting temperature of the fining vessel wall.

One method of increasing the temperature in the fining vessel is to develop an electric current in the fining vessel, wherein the temperature is increased via the electrical resistance of the vessel's metal wall. Such direct heating may be referred to as Joule heating. To accomplish this, electrodes, also referred to as flanges, are attached to the fining vessel and serve as entrance and exit locations for the electric current.

Figure 6:
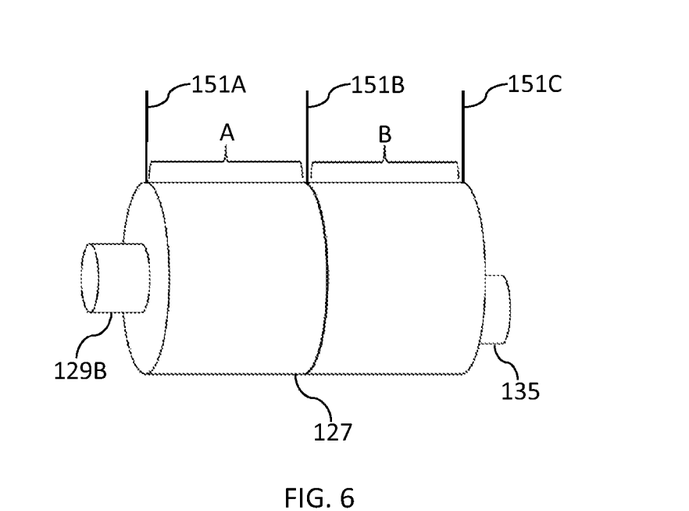
FIG. 6 is a perspective view of a fining vessel according to embodiments disclosed herein.

FIG. 6 illustrates an exemplary perspective view of an embodiment of a fining vessel 127 having three electrodes attached thereto, namely first electrode 151A, second electrode 151B, and third electrode 151C. In the embodiment illustrated in FIG. 6, fining vessel 127 is configured as a tube comprising a wall. The wall may, for example, comprise at least one metal selected from the group consisting of platinum, rhodium, palladium, iridium, ruthenium, osmium and alloys thereof. The electrodes encircling the tube and configured to conduct an electric current through the wall, may for example, comprise at least one of platinum, rhodium, palladium, iridium, ruthenium, osmium and alloys thereof. While FIG. 6 shows a cylindrical cross sectional shape, it should be understood that other geometric cross sectional shapes may be employed, for example, an elliptical shape, an oval shape, or a "race track" (oblong) shape comprising two relatively planar wall portions connected by curved wall portions. To reduce heat loss from fining vessel 127, the fining vessel can be surrounded by one or more layers of a refractory insulating material (not shown), and thermocouples embedded within this refractory jacket may be used to monitor the temperature of the fining vessel at or near the location of the thermocouple.

Fining vessel 127 of FIG. 6 is divided into two zones, a first zone (A) and a second zone (B) downstream from the first zone. To extract the greatest amount of gas from the molten glass in the fining vessel 127, the molten glass is raised to a predetermined fining temperature in the first zone. Heating of the molten glass may occur within bubbling vessel outlet tube 129B such that the molten glass is at or near the predetermined fining temperature of the first zone as it enters the fining vessel 127. For a direct heated fining vessel, the current can be an alternating current (AC) or a direct current (DC). Direct heating of both the bubbling vessel outlet tube 129B and the fining vessel 127 may be employed, and thus both the bubbling vessel outlet tube 129B and the fining vessel may comprise flanges.

In certain exemplary embodiments, the average temperature of the first zone (A) is higher than the average temperature of the second zone (B). For example, embodiments disclosed herein include those in which the average temperature of the first zone (A) is at least 50° C. higher, such as at least 75° C., and further such as at least 100° C. higher than the average temperature of the second zone (B). Embodiments disclosed herein also include those in which the average temperature of the first zone (A) ranges from 50° C. to 150° C., such as from 75° C. to 125° C. higher than the average temperature of the second zone (B).

In certain exemplary embodiments, the average temperature of the first zone (A) is at least 1650° C., such as at least 1675° C., and further such as at least 1700° C., and yet further such as at least 1725° C., such as from 1650° C. to 1750° C., including from 1675° C. to 1725° C. In such embodiments, the average temperature of the second zone (B) may be at least 50° C. lower, such as at least 75° C. lower, and further such as at least 100° C. lower than the first zone (A), such as from 1550° C. to 1650° C., including from 1575° C. to 1625° C.

While FIG. 6 shows first zone (A) and second zone (B) having a similar axial length, it is to be understood that embodiments disclosed herein include those in which axial lengths of the first and second zones differ, such as when the first zone is axially longer than the second zone and when the second zone is axially longer than the first zone.

Maintaining the average temperature of the first zone (A) to be higher than the average temperature of the second zone (B), such as at least 50° C. higher than the second zone (B), can, for example, enable increased glass melt homogeneity, while at the same time, enabling any finer sourced bubbles generated in the first zone (A) to have enough time to reach the free molten glass surface before exiting the fining vessel 127.

Figure 7:
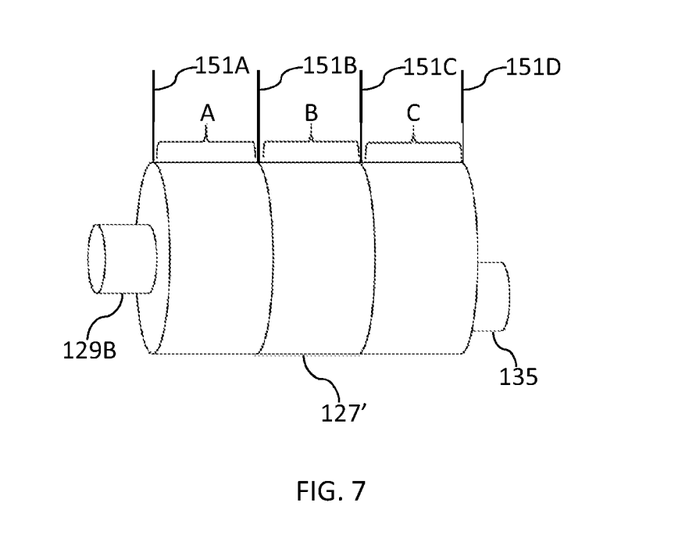
FIG. 7 is a perspective view of an alternate embodiment of a fining vessel according to embodiments disclosed herein.

FIG. 7 illustrates an exemplary perspective view of an embodiment of a fining vessel 127' having four electrodes attached thereto, namely first electrode 151A, second electrode 151B, third electrode 151C, and fourth electrode 151D. Fining vessel 127 of FIG. 7 is divided into three zones, a first zone (A), a second zone (B) downstream from the first zone, and a third zone (C) downstream from the second zone.

In certain exemplary embodiments, the average temperature of the first zone (A) is higher than the average temperature of the second zone (B) or the average temperature of the third zone (C). For example, embodiments disclosed herein include those in which the average temperature of the first zone (A) is at least 50° C. higher, such as at least 75° C., and further such as at least 100° C. higher than the average temperature of the second zone (B) or the third zone (C). Embodiments disclosed herein also include those in which the average temperature of the first zone (A) ranges from 50° C. to 150° C., such as from 75° C. to 125° C. higher than the average temperature of the second zone (B) or the third zone (C).

In certain exemplary embodiments, the average temperature of the second zone (B) is higher than the average temperature of the third zone (C). For example, embodiments disclosed herein include those in which the average temperature of the second zone (B) is at least 25° C. higher, such as at least 50° C., and further such as at least 75° C. higher than the average temperature of the third zone (C). Embodiments disclosed herein also include those in which the average temperature of the second zone (B) ranges from 25° C. to 125° C., such as from 50° C. to 100° C. higher than the average temperature of the third zone (C).

In certain exemplary embodiments, the average temperature of the first zone (A) is higher than the average temperature of the second zone (B) and the average temperature of the second zone (B) is higher than the average temperature of the third zone (C). For example, embodiments disclosed herein include those in which the average temperature of the first zone (A) is at least 50° C. higher than the average temperature of the second zone (B) and the average temperature of the second zone (B) is at least 25° C. higher than the average temperature of the third zone (C). Embodiments disclosed herein also include those in which the average temperature of the first zone (A) ranges from 50° C. to 150° C. higher than the average temperature of the second zone (B) and the average temperature of the second zone (B) ranges from 25° C. to 125° C. higher than the average temperature of the third zone (C).

Maintaining the average temperature of the first zone (A) to be higher than the average temperature of the second zone (B), and maintaining the average temperature of the second zone (B) to be higher than the average temperature of the third zone (C) can, for example, enable finer tuning of increased glass melt homogeneity, while at the same time, enabling any finer sourced bubbles generated in the first zone (A) to have enough time to reach the free molten glass surface before exiting the fining vessel 127.

While FIG. 7 shows first zone (A), second zone (B), and third zone (C) having similar axial lengths, it is to be understood that embodiments disclosed herein include those in which axial lengths of the first, second, and third zones differ. In addition, while FIGS. 6 and 7 show fining vessels with two and three zones (and there and four electrodes) respectively, it is to be understood that embodiments disclosed herein include fining vessels having greater numbers of zones (and electrodes), such as at least four zones (and five electrodes), at least five zones (and six electrodes) and so on.

Embodiments disclosed herein may be used with a variety of glass compositions. Such compositions may, for example, include a glass composition, such as an alkali free glass composition comprising 58-65 wt % $SiO_2$, 14-20 wt % $Al_2O_3$, 8-12 wt % $B_2O_3$, 1-3 wt % MgO, 5-10 wt % CaO, and 0.5-2 wt % SrO. Such compositions may also include a glass composition, such as an alkali free glass composition, comprising 58-65 wt % $SiO_2$, 16-22 wt % $Al_2O_3$, 1-5 wt % $B_2O_3$, 1-4 wt % MgO, 2-6 wt % CaO, 1-4 wt % SrO, and 5-10 wt % BaO. Such compositions may further include a glass composition, such as an alkali free glass composition, comprising 57-61 wt % $SiO_2$, 17-21 wt % $Al_2O_3$, 5-8 wt % $B_2O_3$, 1-5 wt % MgO, 3-9 wt % CaO, 0-6 wt % SrO, and 0-7 wt % BaO. Such compositions may additionally include a glass composition, such as an alkali containing glass composition, comprising 55-72 wt % $SiO_2$, 12-24 wt % $Al_2O_3$, 10-18 wt % $Na_2O$, 0-10 wt % $B_2O_3$, 0-5 wt % $K_2O$, 0-5 wt % MgO, and 0-5 wt % CaO, which, in certain embodiments, may also include 1-5 wt % $K_2O$ and 1-5 wt % MgO.

Embodiments disclosed herein can enable the production of glass sheets having reduced defects, such as blisters, cords, and/or knots. For example, embodiments disclosed herein may enable the production of glass sheets having at least a 30% reduction, such as at least a 50% reduction, and further such as at least a 70% reduction of blisters having a length of greater than 300 microns, including the production of glass sheets having at least a 30% reduction, such as at least a 50% reduction, and further such as at least a 70% reduction of blisters having a length of greater than 200 microns, and yet further the production of glass sheets having at least a 30% reduction, such as at least a 50% reduction, and further such as at least a 70% reduction of blisters having a length of greater than 100 microns, including the production of glass sheets having at least a 30% reduction, such as at least a 50% reduction, and further such as at least a 70% reduction of blisters having a length of from 100 to 500 microns, relative to methods that do not include embodiments disclosed herein.

While specific embodiments disclosed herein have been described with respect to an overflow downdraw process, it is to be understood that the principle of operation of such embodiments may also be applied to other glass forming processes such as flow processes and slot draw processes.

It will be apparent to those skilled in the art that various modifications and variations can be made to the embodiments of the present disclosure without departing from the spirit and scope of the disclosure. Thus, it is intended that the present disclosure cover the modifications and variations of these and other embodiments provided they come within the scope of the appended claims and their equivalents.

What is claimed is:

1. An apparatus for producing a glass article comprising a melting vessel, a fining vessel located downstream from the melting vessel, and a bubbling vessel that is downstream from the melting vessel and upstream from the fining vessel, the bubbling vessel further comprising a plurality of gas feed orifices arranged in a circular pattern at a bottom of the bubbling vessel, the plurality of gas feed orifices in fluid communication with a gas feed such that gas bubbles are introduced from the gas feed through the gas feed orifices at the bottom of the bubbling vessel, wherein an average temperature in the bubbling vessel is at least 50° C. lower than an average temperature in the fining vessel and wherein the average temperature in the bubbling vessel is from about 50° C. to about 150° C. higher than an average temperature in the melting vessel, and wherein a bubbling vessel inlet tube connects the melting vessel and the bubbling vessel, and a bubbling vessel outlet tube connects the bubbling vessel and the fining vessel, the average temperature in the bubbling vessel is from about 25° C. to about 100° C. higher than an average temperature of the bubbling vessel inlet tube, wherein the fining vessel comprises at least a first zone and a second zone downstream from the first zone, wherein an average temperature of the first zone is higher than an average temperature of the second zone, wherein the average temperature of the first zone is at least 50° C. higher than the average temperature of the second zone, wherein the fining vessel comprises a third zone downstream from the second zone, wherein the average temperature of the second zone is at least 25° C. higher than an average temperature of the third zone.

2. The apparatus of claim 1, wherein the gas bubbles are selected from at least one of a group consisting of nitrogen, oxygen, air, noble gases, and mixtures of the same.

3. The apparatus of claim 2, wherein the gas bubbles have an average size ranging from about 2 millimeters to about 50 millimeters.

4. The apparatus of claim 1, wherein the bubbling vessel is fluidly connected to the fining vessel via the bubbling vessel outlet tube, the bubbling vessel outlet tube comprising at least one mixer.

5. The apparatus of claim 1, further comprising a static mixer positioned in one or more of the bubbling vessel inlet tube or the bubbling vessel outlet tube.

6. The apparatus of claim 5, wherein the static mixer comprises a first static mixer positioned in the bubbling vessel inlet tube and a second static mixer positioned in the bubbling vessel outlet tube.

7. An apparatus for producing a glass article comprising a melting vessel, a fining vessel located downstream from the melting vessel, and a bubbling vessel that is downstream from the melting vessel and upstream from the fining vessel, wherein a bubbling vessel inlet tube connects the melting vessel and the bubbling vessel, and a bubbling vessel outlet tube connects the bubbling vessel and the fining vessel, further comprising one or more static mixers in the bubbling vessel inlet tube and one or more static mixers in the bubbling vessel outlet tube, wherein a first portion of the one or more static mixers in the bubbling vessel inlet tube are attached to a top surface of the bubbling vessel inlet tube, and a second portion of the one or more static mixers in the bubbling vessel inlet tube are attached to a bottom surface of the bubbling vessel inlet tube.

8. An apparatus for producing a glass article comprising a melting vessel, a fining vessel located downstream from the melting vessel, and a bubbling vessel that is downstream from the melting vessel and upstream from the fining vessel, wherein a bubbling vessel inlet tube connects the melting vessel and the bubbling vessel, and a bubbling vessel outlet tube connects the bubbling vessel and the fining vessel, further comprising one or more static mixers in the bubbling vessel inlet tube and one or more static mixers in the bubbling vessel outlet tube, wherein a first portion of the one or more static mixers in the bubbling vessel outlet tube are attached to a top surface of the bubbling vessel outlet tube, and a second portion of the one or more static mixers in the bubbling vessel outlet tube are attached to a bottom surface of the bubbling vessel outlet tube.

\* \* \* \* \*